(No Model.)

H. LINDESTROM.
WHEEL PLOW.

No. 504,531. Patented Sept. 5, 1893.

Witnesses:
S. A. Davenport
E. Behel

Inventor:
Hjalmar Lindestrom
By A. O. Behel
Atty.

UNITED STATES PATENT OFFICE.

HJALMAR LINDESTROM, OF ROCKFORD, ILLINOIS.

WHEEL-PLOW.

SPECIFICATION forming part of Letters Patent No. 504,531, dated September 5, 1893.

Application filed May 13, 1893. Serial No. 474,150. (No model.)

*To all whom it may concern:*

Be it known that I, HJALMAR LINDESTROM, a citizen of the United States, residing at Rockford, in the county of Winnebago and State of Illinois, have invented certain new and useful Improvements in Wheeled Plows, of which the following is a specification.

The object of this invention is to support the plow in an adjustable manner in order that its point may be depressed to easily enter the ground, or elevate it so that it will free itself from the ground, and also capable of being placed in a horizontal position for proper working, and when adjusted can be raised or lowered bodily.

Figure 1:
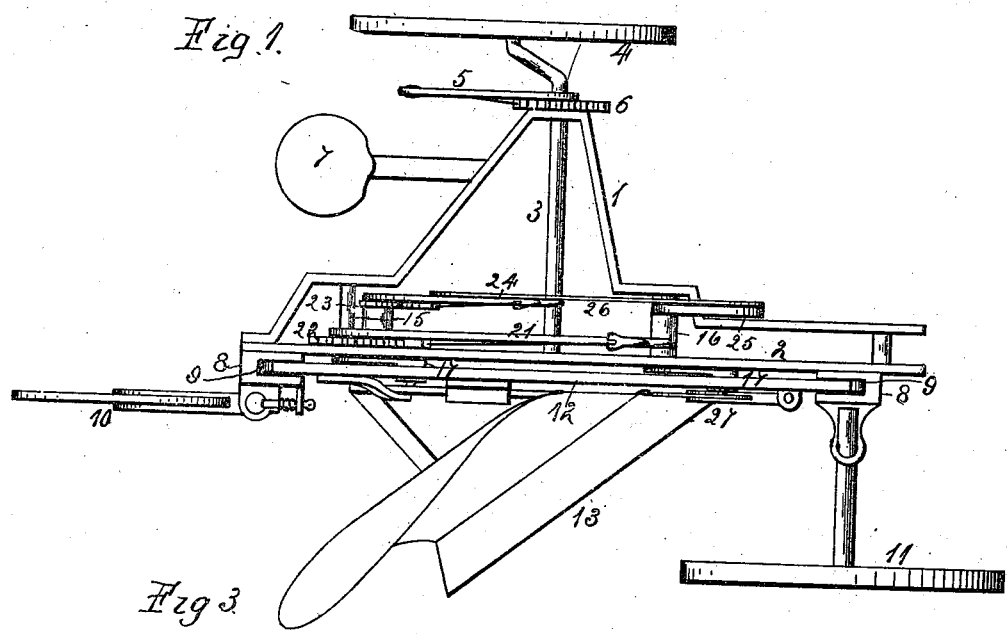
Figure 3:
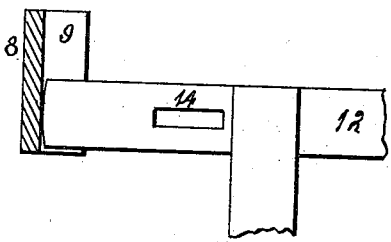
Figure 4:
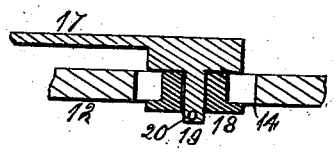
Figure 2:
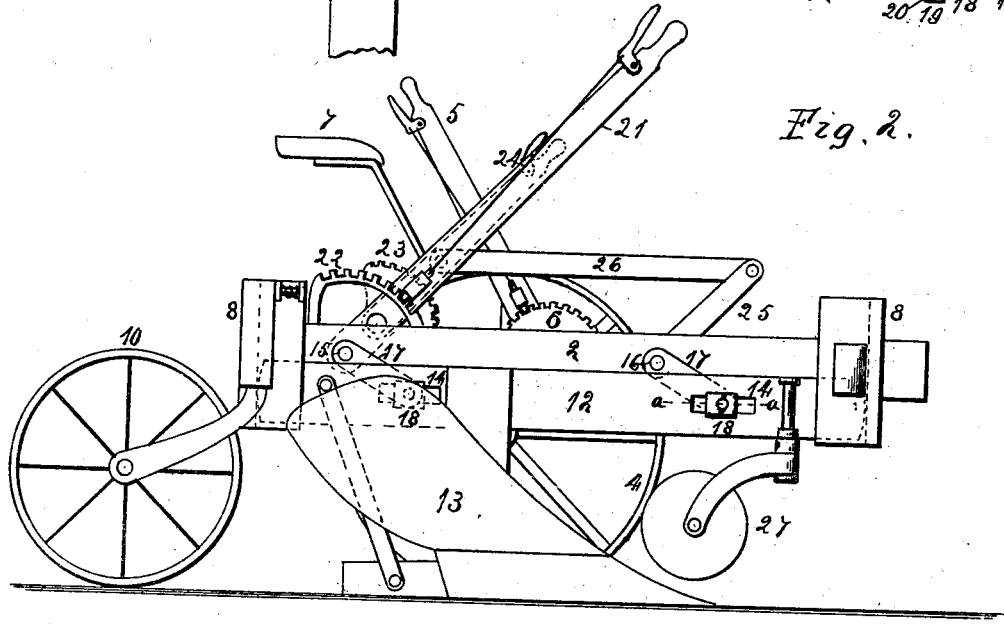

In the accompanying drawings, Figure 1, is a plan view of a plow showing my improvements. Fig. 2, is a side elevation in which the steering wheel has been omitted. Fig. 3, is a vertical section through the guide ways and plow support. Fig. 4, is an enlarged section on dotted line a, Fig. 2.

The plow represented in the drawings in the main is of a well known construction, and the parts will be mentioned in order to understand the relation of my improvements thereto.

The main frame consists of the irregular portion 1, having its free ends connected by a bar 2. An axle 3, has a pivotal connection with the main frame and supports a wheel 4. A lever 5 is secured to the axle, and a toothed segment 6, holds it when adjusted by means of which the plow can be leveled when the wheel is in a furrow. A seat 7, has a connection with the frame. To the sides of the bar 2, near its ends are secured guide ways 8, provided with a vertical groove 9, and which move in contact with the inner faces of the beam 12. To the rear shaft 15, is secured a lever 21, and a toothed segment 22, is secured to the main frame, the lever having a thumb latch for operating the dog in its engagement with the toothed segment. To this lever is secured a toothed segment 23, extending some distance from its inner face, and to the support of this segment is pivoted a lever 24, provided with a thumb lever, in order to permit of its adjustment in its connection with the toothed segment. To the shaft 16, is secured an arm 25, extending upwardly and a link 26, connects this arm with the lever 24, above the toothed segment.

In the drawings I have in the rear guide way shown the plow lowered on a level with the bottom of the supporting wheels of the main frame, and the levers 21, and 24, standing in an oblique forward position. As the lever 24, is supported by the main lever 21, any movement imparted to the main lever will also be imparted to the adjusting lever 24. Should the attendant pull back upon the main lever, the shafts 15 and 16 would be rocked upon their pivotal connection with the main frame consequently moving the free ends of the cranks 17, in an upward direction, and by reason of their engagement with the beam or plow support 12, the beam will be elevated, both ends alike, consequently raising the plow.

When it is desired to dip the point of the the plow this may be accomplished by means of the adjusting lever, by releasing it from its engagement with the toothed segment 23, and moving it forward the link 26, forming a connection between the lever 24 and crank 17, and as the crank is depressed it will allow the point of the plow to descend. A reverse movement of the lever 24, would elevate the point of the plow, and when the plow has been adjusted it may be raised or lowered bodily by the manipulation of the main lever. A colter 27, has a connection with the plow support and will always bear the same relation to the point of the plow.

I claim as my invention—

1. In a wheeled plow, the combination of a main frame and supporting wheels, vertical guideways, a plow beam held in position by the guide ways and provided with lengthwise slots, a main lever having a pivotal connection with the main frame, an adjusting lever having a pivotal connection with the main lever, both levers having a crank connection with the plow beam by guides located in the slots.

2. In a wheeled plow, the combination of a main frame and supporting wheels, vertical grooves formed in the main frame, a plow beam located in and guided by the grooves, a main lever having a pivotal connection with the main frame, a toothed segment for the main lever secured to the main frame, an adjusting lever having a pivotal connection with the main lever, a toothed segment for the adjusting lever secured to the main lever, a crank connection between the main lever and the plow beam and a crank and link connection between the adjusting lever and the plow beam.

HJALMAR LINDESTROM.

Witnesses:
A. O. BEHEL,
E. BEHEL.